United States Patent
Götz et al.

(10) Patent No.: US 8,665,670 B2
(45) Date of Patent: *Mar. 4, 2014

(54) ACOUSTIC DETERRENCE (75) Inventors: Thomas Götz, Fife (GB); Vincent M. Janik, Fife (GB)

(73) Assignee: The University Court of the University of St. Andrews, St. Andrews, Fife (GB)

( * ) Notice: Subject to any disclaimer, the term of this patent is extended or adjusted under 35 U.S.C. 154(b) by 0 days.

This patent is subject to a terminal disclaimer.

(21) Appl. No.: 13/619,903

(22) Filed: Sep. 14, 2012

(65) Prior Publication Data

US 2013/0021877 A1 Jan. 24, 2013

Related U.S. Application Data (63) Continuation of application No. 12/596,337, filed as application No. PCT/GB2008/050245 on Apr. 7, 2008, now Pat. No. 8,289,812.

(30) Foreign Application Priority Data

Apr. 20, 2007 (GB) .................................. 0707640.9

(51) Int. Cl.
*B06B 3/00* (2006.01)
*G10K 11/00* (2006.01)

(52) U.S. Cl.
CPC .. *G10K 11/00* (2013.01); *B06B 3/00* (2013.01)
USPC ......................................... 367/139; 367/136

(58) Field of Classification Search
USPC ......................................................... 367/136
See application file for complete search history.

(56) References Cited

U.S. PATENT DOCUMENTS

| | | | |
|---|---|---|---|
| 3,885,338 A | 5/1975 | York |
| 4,488,271 A | 12/1984 | Held |
| 4,546,459 A | 10/1985 | Congdon |
| 4,922,468 A | 5/1990 | Menezes |
| 4,932,007 A | 6/1990 | Suomala |
| 4,945,520 A | 7/1990 | Ford |
| 4,965,552 A | 10/1990 | Price |
| 5,117,572 A | 6/1992 | Parra |
| 5,291,682 A | 3/1994 | Zaccheo |
| 5,559,759 A | 9/1996 | Gerstein et al. |
| 5,570,322 A | 10/1996 | Miller |
| 5,610,876 A | 3/1997 | Jeffers |

(Continued)

FOREIGN PATENT DOCUMENTS

| | | | |
|---|---|---|---|
| CA | 2 091 043 A | 9/1994 |
| EP | 0 242 945 A | 10/1987 |

(Continued)

OTHER PUBLICATIONS

Hirsch et al., "Auditory-Threshold Recovery Afet Exposures To Pure Tones", J. Acoust. Soc. Am., vol. 27, Issue 5, pp. 1013.
Koch et al., "The acoustic startle response in rats-circuits mediating evocation inhibition and potentiation", Behavioural Brain Research, vol. 89, Issues 1-2, pp. 35-49, (Dec. 1997).
Nedwell et al., "Fish and Marine Mammal Audiograms: A summary of available information", Subacoustech Ltd, pp. 1-281, (Sep. 3, 2004).

*Primary Examiner* — Isam Alsomiri
*Assistant Examiner* — James Hulka
(74) *Attorney, Agent, or Firm* — Drinker, Biddle & Reath, LLP (57) ABSTRACT

A method of deterring mammals comprising configuring an acoustic deterrent system to emit an acoustic signal having characteristics which repel the mammals by eliciting an acoustic startle response reflex in said mammals.

48 Claims, 7 Drawing Sheets

(56) References Cited

U.S. PATENT DOCUMENTS

| | | |
|---|---|---|
| 5,627,801 A | 5/1997 | Saunders |
| 5,883,858 A | 3/1999 | Holt |
| 6,250,255 B1 | 6/2001 | Lenhardt et al. |
| 8,289,812 B2 * | 10/2012 | Gotz et al. .................... 367/139 |
| 2002/0131472 A1 | 9/2002 | Draxton et al. |
| 2003/0058740 A1 | 3/2003 | Jincks |
| 2004/0008581 A1 | 1/2004 | Nadeau |
| 2004/0076080 A1 | 4/2004 | Niezrecki et al. |
| 2004/0175011 A1 | 9/2004 | Schaub |
| 2004/0196998 A1 | 10/2004 | Noble |
| 2005/0004711 A1 | 1/2005 | Hirose |
| 2005/0062604 A1 | 3/2005 | Fong et al. |
| 2005/0232083 A1 * | 10/2005 | Borsina et al. ................ 367/139 |
| 2005/0232084 A1 | 10/2005 | DiNapoli |

FOREIGN PATENT DOCUMENTS

| | | |
|---|---|---|
| GB | 2434070 A | 7/2007 |
| JP | 55-120730 | 9/1980 |
| JP | 3057970 | 6/1999 |
| WO | WO 95 00016 A | 1/1995 |
| WO | WO 95/00016 A | 1/1995 |
| WO | WO 98/03062 A | 1/1998 |
| WO | WO 9803062 | 1/1998 |

* cited by examiner

ACOUSTIC DETERRENCE

CROSS-REFERENCE TO RELATED APPLICATION

This application is a continuation of application Ser. No. 12/596,337, filed Jan. 21, 2010, and is assigned to the same assignee as the prior application.

BACKGROUND

This application relates to acoustic deterrence and, in particular, to an acoustic deterrent device and methods for deterring mammals, most particularly but not exclusively marine mammals.

Worldwide, farming of marine and diadromous finfish species has experienced tremendous growth rates, showing a ten fold increase over the last three decades. This increase in potential food resources presented in a marine environment has brought about increased interactions with predatory species. One common group of predators is marine mammals who exploit food resources depending on their profitability and potential costs, which include dive depths as a major factor. The shallow depth of fish farms thus makes them particularly attractive to predators.

In particular, predatory behaviour of pinnipeds is a major concern, causing a variety of economical and market related risks for the fish farm owner. Accordingly, there is much interest in developing anti-predator control methods.

These methods include net modifications, lethal or non-lethal removals, population control and aversive conditioning. However, each of these methods has their own drawbacks. For example, the addition of a second net can cause tangling of predators and non-predatory species; and lethal removals as well as population control may have an impact on populations and raise ethical concerns over the treatment of the animals. Culling of higher order predators can also have negative impact on predation rates by other predators, for example, pinnipeds forage on predatory fish species around the net pen which in turn potentially feed on aquaculturally important species. Also, emetic aversion conditioning requires that individuals learn to associate treated fish with sickness, and this can be hard to achieve when predator numbers are high.

One anti-predator control method that avoids these pitfalls is the use of acoustic deterrent devices (ADDs). These have traditionally been considered to be a benign solution. However, they do present certain problems with respect to the effects they have on other marine wildlife and with habituation, where a target species motivated by a food source ceases to be deterred by the acoustic signals.

If the source level of an ADD is sufficiently high it can cause temporary or permanent hearing damage both to the targeted species and to other wildlife, and the noise pollution is in general an environmental hazard. Further, both targeted and non-targeted species can be excluded from their natural habitat within a wide radius of the fish farms. These concerns have led some governments to restrict or even ban the use of ADDs.

A further problem is the habituation of the target species to the sound. In extreme cases, the sound which is intended to be aversive acts as a "dinner bell" and actually serves to attract predators, rather than deter them. Also, if predator sounds are used as an aversive noise, habituation is dangerous for the target species once they had returned to their normal habitat.

Also, existing power levels and signal cycles impose heavy duty cycles on the batteries used as power sources in the transducer units.

Accordingly, it would be desirable to provide an acoustic deterrent device that is highly effective, but does not damage the environment, is species specific and avoids habituation.

According to a first aspect of the present invention there is provided a method of deterring mammals comprising configuring an acoustic deterrent system to emit an acoustic signal having characteristics which repel the mammals by eliciting an acoustic startle response reflex in said mammals.

"Deterring" is taken to mean discouraging or preventing a mammal from entering into or staying in a particular area. The startle reflex response is a physiological reflex in mammals to particular sounds, which often initiates flight from the sound, thereby repelling mammals from a location in the vicinity of the sound. The startle reflex response should not be confused with an animal or person being "started" or "startled" in the colloquial or everyday sense.

In an embodiment, the method of incurring an acoustic startle reflex response comprises the steps of:
  selecting a target order, family, genus or species of mammals to be deterred;
  selecting a received level at a predetermined level above a representative hearing threshold of the targeted mammals;
  transmitting an acoustic signal from a transmission point at a source level required, taking into account transmission loss, to create the selected received level at a predetermined distance from the transmission point.

In an embodiment, the predetermined level is between 90 dB and 125 dB re 1 µPa above the representative hearing threshold at each frequency.

In an embodiment, the acoustic signal has a duration about as long as the acoustic integration time specific to the targeted mammal's auditory system In an embodiment, the acoustic signal has a duration of less than 200 ms.

In an embodiment the acoustic signal has a rise time of less than 20 ms.

In an embodiment, the acoustic signal is as broadband as possible within the designated frequency range.

In an embodiment, the acoustic signal comprises frequency components at which the aural sensitivity of the targeted mammals is greater than that of selected other animals.

In an embodiment, the acoustic signal uses a frequency band between 500 Hz and 2 kHz for the deterrence of seals or other pinnipeds. The acoustic signal is as broadband as possible within this frequency range.

In an embodiment, the mammals to be deterred comprise sea mammals including pinnipeds, such as seals; or cetaceans.

Alternatively, the mammals to be deterred comprise land mammals.

In an embodiment, a secondary conditioning sound is made to condition the mammals to avoid the main stimulus. This could be a sound of centre frequency 1 kHz, modulation rate 250 Hz and duration 1.2 seconds with two modulation cycles.

In an embodiment, the conditioning sound is played between 500 ms and 5 s before the main acoustic signals on selected occasions.

According to a second aspect of the invention, there is provided a method of deterring marine mammals comprising transmitting an acoustic signal which comprises an aversive sound whose characteristics are chosen based on characteristics that are unpleasant to humans.

In an embodiment, the aversive sound is selected to have one or more of the following psychophysical features: high roughness; low tonality; high loudness; high sharpness.

In an embodiment a frequency modulation is applied to the carrier signal, most preferably with a modulation frequency of about 70 Hz.

This frequency modulation is applied in order to achieve high roughness.

In an embodiment, the frequency modulation has a modulation depth of between 10 and 150%, preferably 50% of the centre frequency of the carrier signal.

In an embodiment, the aversive sound has a sound pressure level of at least 70 dB above the hearing threshold of the targeted mammals, most in an embodiment at least 80 dB above the hearing threshold of the targeted mammals.

In an embodiment, an aversive sound is of a complex form and comprises partials that fall within 25% of the critical bandwidth of the hearing system of the targeted mammals.

In an embodiment, when cetaceans are to be deterred the acoustic signals could be close to the upper frequency edge of the hearing range in order to increase sharpness.

In an embodiment, the acoustic signal is as broadband as possible within the selected frequency band in order to increase loudness without increasing the actual sound pressure level.

In an embodiment, the aversive sound comprises frequency components at which the aural sensitivity of the targeted mammals is greater than that of selected other animals.

In an embodiment, the acoustic signal comprises one or more frequency components between 500 Hz and 2 kHz for the deterrence of seals or other pinnipeds.

In an embodiment, sound exposure time is determined based on a sound exposure level below that which causes a temporary threshold shift in the target and non-target species, for example an energy flux density of 120 dB re 1 $\mu Pa^2 s^{-1}$ above the hearing threshold of the targeted mammals.

According to a third aspect of the present invention there is provided an acoustic deterrent device comprising a signal transducer arranged to transmit acoustic signals in accordance with the method of the first aspect and/or the method of the second aspect.

According to a fourth aspect of the present invention there is provided an acoustic deterrent system comprising a control unit, a power source, amplifier and transducer means, co-operable to perform the method of the first aspect and/or the method of the second aspect.

According to a fifth aspect of the invention there is provided control software executable on a computer so that the computer is operable as the control unit of the fourth aspect.

The control software can be provided recorded on a computer readable medium, or made available for download.

According to a sixth aspect of the present invention there is provided an acoustic signal which incurs a startle reflex response in mammals in order to deter them. The acoustic signal can be produced and used in accordance with any of the previous mentioned aspects.

According to a seventh aspect of the invention there is provided an acoustic signal for the deterrence of mammals which comprises an aversive sound whose characteristics are chosen based on characteristics that are unpleasant to humans. The acoustic signal can be produced and used in accordance with any of the previous mentioned aspects.

BRIEF DESCRIPTION OF THE DRAWINGS

The present invention will now be described, by way of example only, with reference to the accompanying figures in which:

FIG. 5 shows a comparison of seal sightings during field trials on both control days and sound days for (a) closest approaches and (b) average distance from an Acoustic Deterrent Device;

FIG. 6 shows a comparison of porpoise sightings during field trials on both control days and sound days for (a) closest approaches and (b) average distance from an Acoustic Deterrent Device;

DESCRIPTION OF THE EMBODIMENTS

A variety of Acoustic Deterrent Devices (ADDs) are available to reduce or stop predation of pinnipeds on finfish farms. These include for example the Ferranti-Thomson Mk2, Mk3 and 4× Seal scrammers, the Ace-Aquatec "silent scrammer", the Airmar Technology Corporation dB Plus II, the Terecos Limited type DSMS-4 and the Lofitech "universal scarer" or "seal scarer".

Figure 1:
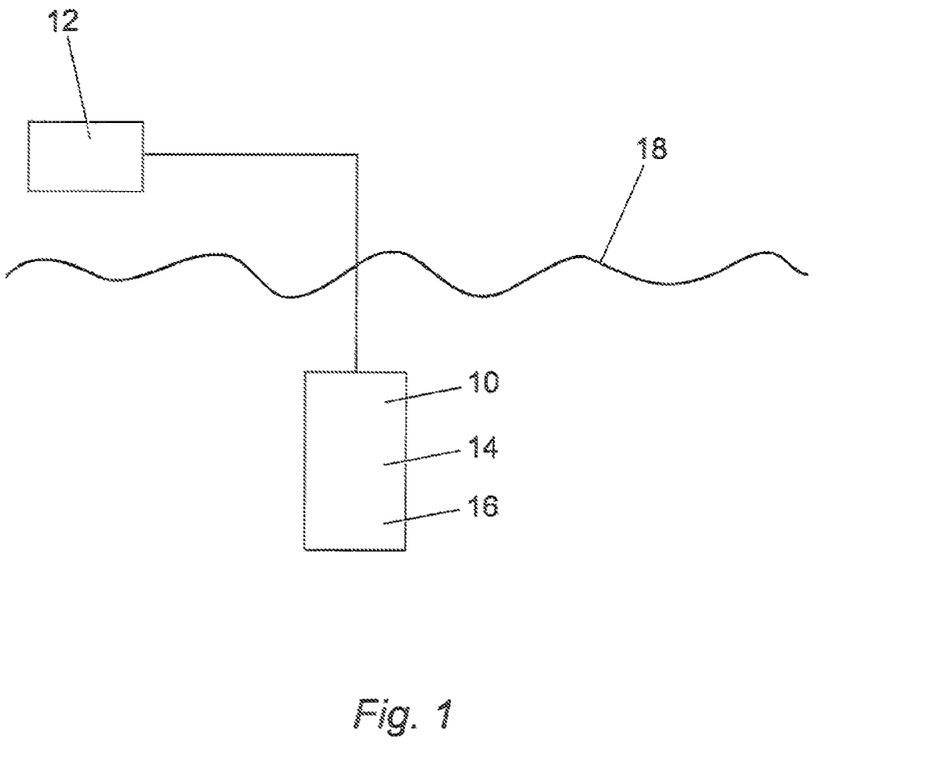
FIG. 1 shows an acoustic deterrent system.

As seen in FIG. 1, an ADD comprises a power source 10 (usually marine batteries), a control unit 12, an amplifier 14 and an underwater transducer (speaker) 16. The embodiment shown in FIG. 1 shows all of the power source, amplifier and transducer being below the water surface 18, but it will be appreciated that any suitable arrangement of these components can be used, for example one or more of the power source and amplifier may be situated remote from the transducer 16 and as such could be above the surface 18, or as a further example, all the components could be underwater, not just the transducer.

The control unit 12 typically includes a computer that has a number of sound files stored on it which generate signals to be relayed through the amplifier 14 and broadcasted into the water. The control unit 12 also controls the timing of the sounds which are played.

Sound being played is characterised by its source levels, rise time, frequency composition and duration. Additionally, the inter-sound interval determines how quickly sounds follow each other.

The "source level" (SL) is a measurement of the acoustic output of the device at 1 m distance. In the following text, source levels and received levels in general will be denoted in units of decibels (dB) measured with reference to 1 µPa, unless a specific statement or context implies otherwise. The "rise time" is a measure of how long it takes for an acoustic signal or pulse to reach its maximum amplitude. The term "sensation levels" refers to the sound pressure level by which a stimulus exceeds the species' auditory threshold (received level minus hearing threshold). Received level refers to the sound pressure level that reaches the animal's ears (source level minus transmission loss). The term sound exposure level (SEL) refers to the energy flux density (being a function of sound pressure level and exposure time) and is given by SEL=SPL+10 $\log_{10}$ (exposure time) where SPL is the sound pressure level of a received sound.

When designing an acoustic deterrent device there are various factors that must be taken into account, including ecological impacts (on both target and non-target species), and problems and potential solutions.

Ecological Impacts

Species of Concern

Any animal that can perceive acoustic sounds can be potentially adversely affected by them. These affects can be wide ranging. For example, the Ferranti-Thomson 4×ADD has a power of over 200 dB re 1 µPa at 25 kHz and the signals from this device can be audible to a harbour porpoise (*Phocoena phocoena*) for up to 10 km. The zone of potential audibility for a harbour seal for a 175 dB re 1 µPa source is thought to lie between approximately 1.4 km and 2.9 km.

Hearing Damage

ADDs could cause hearing damage to target species and to non-target species, which leads to adverse effects on individual animals and the population in general. Hearing damage would also reduce the potential efficiency of the ADD as it would become less audible to the affected predators.

Hearing damage first occurs as a temporary shift of the hearing threshold (TTS) that is fully recoverable after a few hours or days. However, exposure to higher intensity or longer duration acoustic stimuli can cause chronic damage and lead to a permanent threshold shift (PTS). In its mildest form this permanent hearing damage only affects the outer hair cells of the auditory system. This leads to a very subtle rise of the hearing threshold, but also destroys the cochlea amplifier causing a diminishing of the dynamic range and a loss of the ability to discriminate between frequencies.

Hearing damage in any form is a function of sound pressure level (SPL) and exposure time. A sound with a short duration can be safely presented at a higher SPL than a longer one. It has been suggested that stimuli of equal acoustic energy cause similar damage. The sound exposure level (SEL) or energy flux density has been suggested as a measure for defining safe exposure levels, where SEL=SPL+10 $\log_{10}$ (exposure time). However, data on terrestrial mammals seems to suggest that the equal energy criterion underestimates the risk of hearing damage, at least for sound pressures close to a critical level of about 135 dB above the hearing threshold.

No direct measurements of PTS are available for marine mammals, so conclusions have to be drawn based on extrapolation from TTS data or human damage risk criteria (DRC).

Temporary Threshold Shift (TTS)

Studies on odontocetes have found that sound exposure levels between 193 dB and 213 dB re 1 $\mu Pa^2 s^{-1}$ can cause mild to moderate, but fully recoverable TTS. These values are about 100 dB-130 dB re 1 µPa above the hearing threshold of the tested individuals (sound exposure level-sensation level).

Studies on odontocetes have been used to estimate TTS ranges of ADDs for single transmissions (i.e. short pulses) based on equal energy assumptions. Given these assumptions an Airmar dB Plus 11 device (having a source level of 192 dB re 1 µPa) would only cause TTS in bottlenose dolphins at distances closer than 1 m while a high power (200 dB re 1 µPa) Ferranti-Thomson 4× device would have a TTS zone of about 2-3 meters. TTS zones for the harbour porpoise would be 2-3 and 14-25 meters respectively.

These TS zones widen markedly for longer exposure times. Assuming an average sound exposure level-sensation of 115 dB re (hearing threshold in Pa)$^2$-s the respective onset-TTS (SELSL) levels would then be 152 dB re 1 µPa$^2$-s, 158 dB re 1 µPa$^2$-s 145 dB re 1 µPa$^2$-s for the mentioned species respectively. Assuming spherical spreading, absorption losses of 0.7 dB per km continuous exposure to a 10 s at 193 dB re 1 µPa (SEL=203 dB re 1 µPa$^2$-s) would therefore result in TTS zones of 345 m for the harbour porpoises, 175 m for the bottlenose dolphins and over 748 m for killer whales.

Permanent Threshold Shifts (PTS)

Human damage risk criteria (DRC) states that PTS will be caused at or after a critical value of 130 dB above the hearing threshold. Studies of terrestrial mammals have confirmed that such hearing damage occurs quickly when exposed to sound pulses at 130 dB-140 dB above the hearing threshold. Available data on harbour porpoises suggests that a PTS damage zone for harbour porpoises would be 30 m, with a similar result for killer whales (*Orcinus orca*).

Extrapolation of thresholds or PTS from TTS data is problematic, but due to a lack of direct measurements in marine mammals and the difficulties of extrapolation from human DRC such an attempt is justified. Data on humans suggests that exposure levels causing TTS of 40 dB or more carry some risk of causing a PTS. A temporary threshold shift that exceeds 40 dB carries some risk to become permanent and correlates with an increase of the sound exposure pressure level by 20 dB beyond the sound pressure level that causes onset TTS). When applying a sound exposure sensation level criterion of 115 dB re (hearing threshold in Pa)$^2$-s and adding respective auditory thresholds then a 10 s emission from a seal scarer with a source level of 193 dB re 1 µPa would the following damage zones: 18 m, 35 m and 79 m for the bottlenose dolphin, harbour porpoise, and killer whale respectively Long term exposure over months or years requires even more conservative criteria. Accepted noise levels at human industrial workplaces are 85 dB above the hearing threshold zone. An even more conservative 80 dB threshold would be exceeded within a zone of over a kilometer radius for the Airmar dB Plus II device which has a source level of 192 dB re 1 µPa. In areas with dense fish farming activity, animals could be exposed to these levels for extensive amount of time. As studies on humans have shown, initially harmless TTS can turn into PTS if recovery periods are insufficient or non-existent.

Hearing in fish is less well studied in general. However, fish are sensitive to lower frequencies than pinnipeds or cetaceans and studies on fish have been carried out using signals with frequencies of 500 Hz or less, which is within the most sensitive hearing range of fish. This makes it difficult to draw conclusions about the effects of higher frequency signals. However, increasing TTS with increasing exposure levels and weak temporary shifts have been demonstrated in some studies.

Masking

It is important that the sounds produced by ADDs do not overlap with communication or echolocation sounds used by target or non-target mammals.

For a signal to be masked the detection of the signal must be influenced by a second sound—the masker, which will usually be centred at the frequency of the signal. It has been well established that the masking effect is dependent on the bandwidth of the masker until it reaches a so-called critical bandwidth. Therefore, noise only masks a signal if it contains similar frequencies to the signal of interest. Critical bandwidths in marine mammals are generally below 10% of the signal centre frequency.

Additionally, masking effects are attenuated if the masker and the signal come from different directions. In harbour seals minimum distinguishable audible angles for clicks are 4.5 degrees, and in bottlenose dolphins they are less than 3 degrees. Therefore, it seems that cetaceans and pinnipeds may successfully avoid masking effects, but the potential to affect other marine mammal communication networks is high.

Little is known about the impacts of masking on fish. However, their hearing abilities are generally less sophisticated than those of mammals which could make them more prone to masking effects.

Habitat Exclusion

As mentioned above, ADDs for seals have been shown to exclude non-target marine mammals (i.e. cetaceans) from their habitat. This has been confirmed by several studies.

Problems and Solutions

Duty Cycles

If an existing ADD is used continuously, noise pollution is substantial. Duty cycles range from 3% in a Ferranti-Thomson model up to 50% in other designs.

Devices can include additional predator detectors so that the ADD is only triggered when a predator is present. This can be via direct detection of a predator, or from the analysis of the motion patterns of fish in the pens of the fish farm. Such systems are desirable and can be incorporated in combination with the invention.

Frequency Bands

Figure 2:
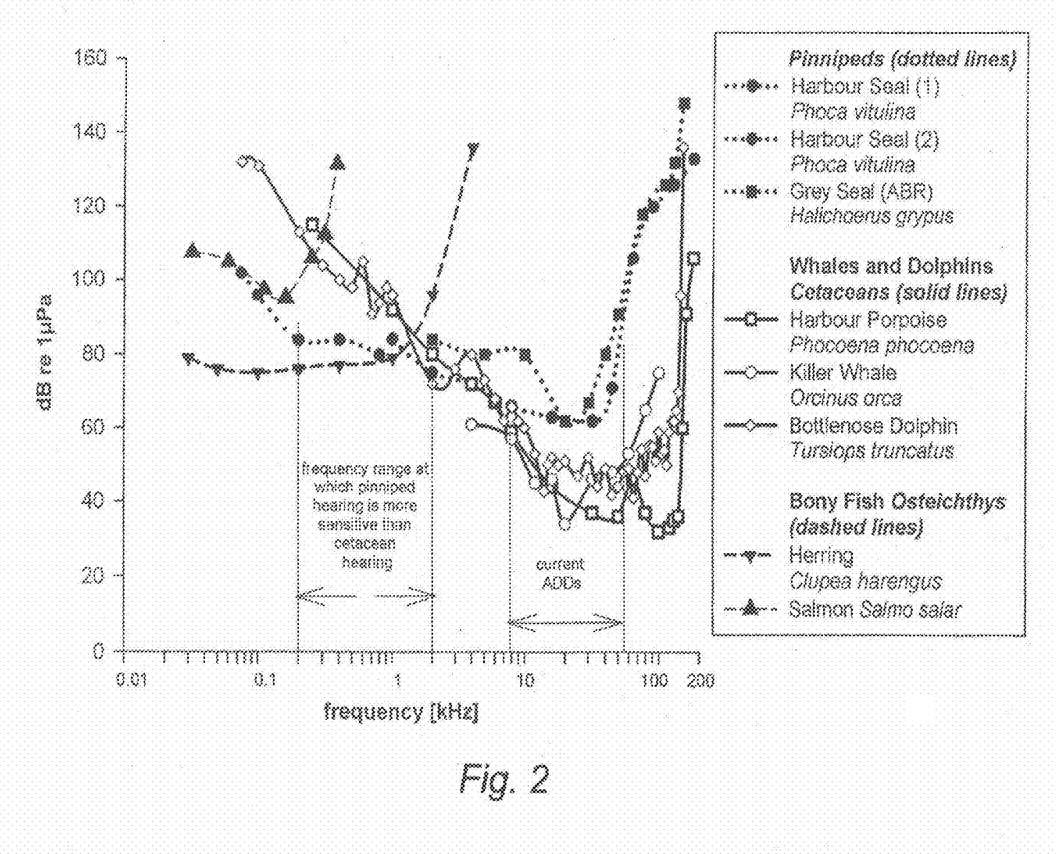
FIG. 2 shows the graph of hearing thresholds for selected animals.

FIG. 2 shows the hearing thresholds for a spectrum of marine wildlife measured in dB with respect to 1 µPa plotted on the Y axis, against frequency in kHz on the logarithmic X axis.

Existing ADDs use frequencies above 4 kHz, at which odontocetes' hearing is generally more sensitive than pinnipeds' hearing. Thus odontocetes perceive a sound of a given SPL as louder than seals do.

Discomfort levels for a captive harbour seals and harbour porpoises have been investigated and it has been found that for a frequency of 12 kHz, harbour porpoises avoid sound that is approximately 5 dB quieter than that avoided by harbour seals. This corresponds to the difference between the hearing thresholds of both species at the relevant frequency.

Some ADDs operate at frequencies close to the most sensitive hearing of pinnipeds, which is between 20 kHz and 30 kHz. However, these frequencies are not suitable because hearing thresholds in odontocetes are even lower in this band. Furthermore, most odontocetes have their most sensitive hearing in the ultrasonic range between 30 and 50 kHz. It would therefore be desirable that no ADD should produce substantial energy above 20 kHz. However, this is the case for the majority of available ADDs.

In a frequency band between 200 Hz and 2 kHz pinnipeds' hearing is more sensitive than odontocetes' hearing and thus appears to be an ideal frequency band for ADDs. This frequency band has not been previously used for pinniped ADDs because it is below the frequencies at which their hearing is most sensitive. However, the inventors have realised that the use of this apparently non-optimal frequency band enables an ADD to have an effect on pinnipeds without adversely affecting cetaceans and odontocetes.

This is a specific example of the inventors' more general realisation that the frequency components for an ADD can be chosen to lie at values at which the aural sensitivity of the targeted mammals is greater than that of selected other animals, even at the expense of using the frequencies corresponding to the lowest hearing thresholds of the targeted mammals.

The lower frequencies (i.e. 500 Hz to 2 kHz in the seal example) may have effects on fish with specialised hearing (such as clupeids) and baleen whales and further research may need to be carried out to quantify this. However, fish species with specialised hearing and most baleen whales do not usually occur around fish farm locations and so this is not anticipated to be a problem when the invention is used in a fish farm environment.

Perception of Received Sound Pressure Levels

Figure 3:
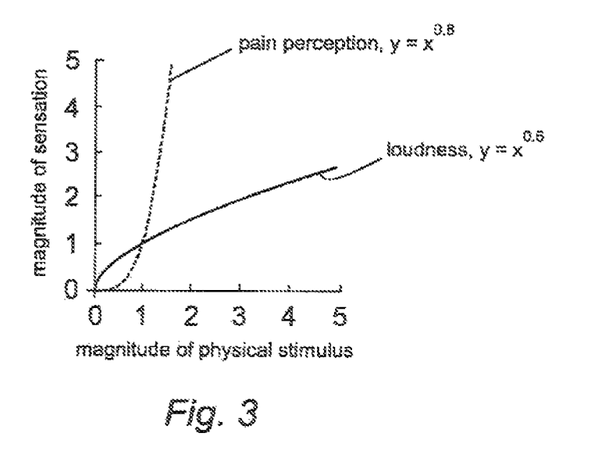
FIG. 3 shows a representation of Stevens Law.

The general paradigm applied in current ADDs is that a high source level is expected to cause physical discomfort or pain and therefore results in an animal leaving an area. However, there are several problems involved when operating at the upper end of the dynamic range of an animal. FIG. 3 shows a qualitative representation of Steven's Law where the magnitude of sensation is plotted against a magnitude of physical stimulus for a sound. Two curves are shown; one shows the loudness of a sound while the other shows the pain perception.

Steven's Law gives an approximate model for the general relationship for the magnitude of sensation, $\psi$, and the magnitude of a physical parameter, $\phi$, as follows:

$$\Psi = k(\phi - \phi_0)^m$$

where k is a constant, $\phi_0$ is the lowest perceivable physical stimulus (threshold), and m is a modality specific coefficient determining the essential shape of the function, in the human auditory system, m is equal to 0.6 (this value is illustrated in FIG. 3).

It can be seen that, as a generalisation, adding a defined sound pressure value (in Pascals) to the high sound pressure stimulus leads only to a small increase of the perceived loudness while adding the same sound pressure value to a low sound pressure stimulus would lead to a stronger increase in perceived loudness. Thus, an increase in sound pressure in the upper range of the curve in FIG. 3 disproportionately increases the risk of damaging the auditory system without yielding a much stronger aversive effect.

The perceived loudness of a sound is generally measured on the sone scale, a doubling of which reflects a doubling of perceived loudness. One sone is defined as a sound that is perceived as equally loud as a 40 dB re 20 µPa tone at 1 kHz in air for humans. The perceived loudness in sones (L) can be calculated by the equation: $L = 0.01 (p - p_0)^{-0.6}$, where p is the sound pressure in µPa and $p_0$ is the effective threshold.

Figure 4:
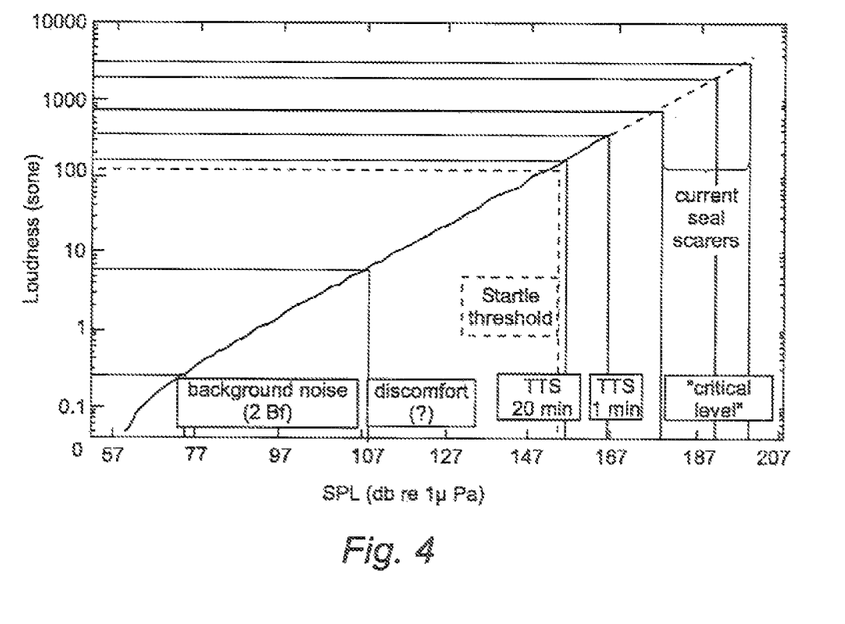
FIG. 4 shows the calculated loudness perception of a 2.5 kHz tone in a harbour seal.

FIG. 4 shows the calculated loudness perception of a 2.5 kHz tone in a harbour seal. A doubling of the loudness in sones reflects a doubling in perceived loudness. The discomfort threshold for the harbour seal is taken to lie at about 6 sones, which is slightly tower than that for humans. Pain thresholds are much higher and usually close to SPLs that cause immediate hearing damage. Thus, current ADDs will not cause pain in most cases, but where pain is caused there is also likely to be hearing damage.

In light of the potential hearing damage caused by the ADDs, the inventors recommend that no attempt should be made to increase the source levels of current ADDs or to use devices that emit sound continuously at source levels at the upper end of the dynamic range close to the suspected pain threshold. Additionally, the critical level of 135 dB above the threshold should not be exceeded at reasonable distances from the sound source as the risk of damage originating from single short term exposures is substantially increased above this level.

A safe exposure level for seals would be a perceived sound exposure level of about 126 $Pa^2 s^{-1}$ above the threshold, which equals a SEL of 183 dB re 1 $\mu Pa^2 s^{-1}$. This was calculated for a 2.5 kHz tone played to a harbour seal.

Recovery times in sound exposure scenarios that do not cause a TTS should be at least ten seconds to avoid accumulation of acoustic trauma. However, acceptable exposure levels should be calculated for the species with the most sensitive hearing in the frequency range used by the ADD. For the currently available ADDs this would usually be an odontocete rather than a pinniped.

Types of Sounds

Killer whale sounds have been shown to be aversive to seals. However, they equally affect cetaceans, making them an unattractive choice. Use of predator sounds also brings the risk that mammals habituate to the predator sounds and become more vulnerable to real predation.

No data is available on aversiveness perception in marine mammals. However, the hearing system is generally similar among all mammals, in particular the basic functioning of the cochlea and peripheral auditory processing in the brain. The inventors propose that data based on human sound perception would be a good starting point for the investigation of aversiveness perception in marine mammals.

Two different versions of ADDs are proposed. The first version uses the mammalian startle response to elicit a flight. Startle sounds that are able to induce the startle reflex response so as to provoke a flight response and repel mammals from a location, exploit an oligo-synaptic reflex arc related to emotional processing in the brain.

In order to elicit the startle reflex response method it is proposed to synthesize and project stimuli with specific acoustic properties; none of which are employed in the current state of the art. In an embodiment, the deterrence system projects single, isolated pulses at random intervals with a sharp onset time. In an embodiment, each interval between isolated pulses is longer than 100 ms, and preferably longer than 500 ms. This helps sensitize the mammal to the sound, as explained in greater detail below. Shorter intervals may cause "pre-pulse inhibition" of consecutive pulses. This is the observed effect that the magnitude of the startle response is reduced by a sound stimulus which precedes the startle sound pulse by less than 100 ms-500 ms.

In an embodiment, the amplitude of the sound exceeds the animals' auditory threshold by more than 80 dB within 50 ms of its onset. Hence, projected sounds may have onset/rise-times between zero and 100 ms at sensation levels (above auditory threshold) of at least 80 dB. The bandwidth of the sound should be as wide as possible with the desired frequency-range and, in an embodiment, may span at least one third of an octave. The deterrence system ensures target-specificity by choosing a frequency band where the auditory threshold of target-species is lower than that of non-target-species. As an example, when seals are to be targeted a frequency range between 500 Hz and 2 kHz may be used. In contrast when odontocetes are targeted a signal with a centre-frequency of 10 kHz could be used. Other values would be selected if other mammals are targeted. These depend on the hearing thresholds of the target species.

The startle reflex response is a physiological reflex to sound levels and has been shown to occur at specific source levels above and hearing threshold of a particular species. It is elicited through a relatively simple reflex and the underlying mechanisms are likely to be shared by mammals. The startle reflex response is usually followed by a flee response in a direction away from the source of the sound. The startle reflex response has been well documented in rats, but mostly for experimental purposes to study the neuronal basis of simple learning behaviours (e.g. sensitisation and habituation). It has not been used in practice for a mammal deterrent device, and has furthermore never been applied to the deterrence of marine mammals in a fish farm or any other practical environment.

The inventors' research has shown that repeated exposure to the certain sounds leads to increased responsiveness i.e. seals become more likely to exhibit flight responses and start avoiding the area where they heard the sound ('sensitisation') [Gotz, T & Janik, V M 2011, 'Repeated elicitation of the acoustic startle reflex leads to sensitisation in subsequent avoidance behaviour and induces fear conditioning' incorporated herein by reference, BMC Neuroscience 12: 30]. This is the opposite of what has been found in current systems where animals get used to the sound and avoidance responses wane. Also, where there is a strong food motivation (known to the target mammal) in an area, a target mammal may not necessarily be repelled by the first pulse of the startle noise, even if startled (i.e. the food motivation overcomes the startle reflex response). The sensitisation effect of the startle sound proposed herein means that, if this is the case, the mammal will be repelled (and will stay away) after a subsequent exposure to the startle sound (i.e. after one or more subsequent pulses).

An additional benefit of the proposed startle sound is that it can comprise short, randomly spaced pulses with a low duty cycle. Therefore the energy consumption of the system can be very low, compared to current ADDs, and battery life increased. Each pulse may, for example, be less than 10 second, or less than 1 second. Similarly the duty cycle may be less than 25%, or less than 10%.

The second version uses aversive sounds that were designed on the basis of a model describing what makes sound pleasant or unpleasant for humans; see Zwicker, E. & Fastl, H. (1990), Psychoacoustics—Facts and Models, Springer-Verlag, New York. The four parameters that are mentioned in the model that predicts what makes sounds unpleasant in humans are high sharpness, high roughness, low tonality and high loudness. In addition, specific frequency differences within complex sounds have been found to be unpleasant (e.g. frequency differences/ratios that constitute unpleasant musical intervals).

To maximise the effects caused by sharpness, higher-frequency signals have to be used, and so sharpness is discarded as a parameter for seal-specific ADDs. However it could be used as a parameter in an ADD for deterring cetaceans; in particular odontocetes (toothed whales) with good high frequency hearing.

Low tonality can be achieved using square-wave sounds as carrier signals that do not have very tonal characteristics (for example when compared with a pure sine wave tone).

In order to maximise roughness the carrier signal should be frequency-modulated. A frequency modulation of between 5 Hz and 200 Hz would be suitable for ADDs, with a potential optimum of about 70 Hz (corresponding to the frequency modulation most effective in humans to cause an unpleasant stimulus).

Modulation depth of the signal can be narrowband or wideband, ranging typically between 10% and 150%. As a particular example, a 50% modulation depth of the centre frequency of the carrier signal may be useful.

As mentioned above, the frequency composition of complex sounds is also a contributing factor to the aversiveness of a sound. Complex sounds that consist of partials (individual sine wave components) having frequency differences falling within 25% of a critical bandwidth are perceived as dissonant in humans. When modelling the hearing system as a series of band-pass filters, the critical bandwidth reflects the bandwidth of each individual filter.

Some examples of suitable sounds that can be synthesised are as follows:

1. 70-Hz frequency modulated square-wave signals with a carrier frequency of 500 Hz and 527 Hz. Both tones are mixed (presented at the same time) resembling the musical interval of a minor second. Modulation depth was 50%.

2. 70-Hz frequency-modulated square-wave tones with carrier frequencies of 500 Hz and 507 Hz. Both tones are mixed (presented at the same time) resembling a frequency distance of 25% of the critical band for a harbour seal (*Phoca vitulina*). Modulation depth was 50%.
3. 70-Hz frequency modulated square-wave tones with a carrier frequency of 500 Hz.
4. A combination of the first three sounds: This sound would consist of elements of variable length (100 ms to a few seconds). Some of these elements are presented as FM sweeps covering a frequency range from 200 Hz to 4 kHz.

It is to be appreciated that these four examples are for illustration purposes only, It has also been observed that broadband signals are perceived to be louder than narrowband signals when played at the same source level, and this can be used to increase the perceived loudness without actually increasing the source level. Thus, for both startle and aversive sounds, a signal is intentionally constructed to be as broadband as possible within the designated frequency band.

Preventing Habituation

Motivational factors clearly influence responses to sound exposure. An acoustic deterrent tested on well fed captive seals gives better performance results than one tested on foraging seals around real fish farms, as food motivation would give seals a higher tolerance for loud sounds.

Habituation could be avoided or at least delayed by a triggering method which only plays sounds when seals approach. This can be triggered by the detection of a seal itself or by the analysis of changing patterns of motion in the swimming of the fish indicating that a predator is present. Using highly variable sound types should also prevent habituation, but no empirical data for animals in the feeding context are available to support this.

Studies in the startle reflex response of rats have indicated that habituation is not caused by an increase of the perceptional threshold eliciting the startle reflex response, but by a change of the slope of the function of the difference between an input signal (SPL) and an output signal (magnitude of response).

This supports the dual process theory of habituation meaning that the response to a repeated stimulus is influenced by a decreasing (sensitisation) and increasing (habituation) component. For ADDs this would mean that the source levels would have to be increased beyond the initial levels to yield the same response as before habituation occurred. Given the abovementioned problems associated with high SPL noise, this is not a good solution.

Ideally, one would aim to replace habituation by sensitization to a sound stimulus. This could be achieved by using high intensity sound intermittently to sensitize a low intensity stimulus. Sensitization through electric stimulation is not feasible since the seal would have to be very close to yield an effect.

In one embodiment, the acoustical stimulus is repeatedly negatively reinforced by an aversive stimulus. Classical conditioning paradigms could be used here. An unconditioned stimulus (e.g. startle sound) causing an unconditioned response (e.g. startle reflex response) is associated with a conditioning stimulus (e.g. an artificial acoustic signal with no biological meaning) which is then able to cause the conditioned response consisting of the same behavioural pattern as the unconditioned response (e.g. startle and flee).

Confirmation of Theory

To confirm the theoretical improvements in acoustic deterrence introduced above, the inventors carried out a number of experiments. To begin with these experiments were conducted in a controlled environment with captive seals building up to a field trial of the invention at a fish farm in which an Acoustic Deterrent Device (ADD) of any type had never been used.

Sensitization to Startle Sounds in Captivity

Experiments with captive seals were carried out under strong food motivation elicited by the presence of an underwater feeding station. The majority of the seals showed a clear startle reflex response as indicated by neck twitches in response to the chosen stimulus (filtered noise pulse 450 Hz and 1.9 kHz; peak frequency 1 kHz, received level 170 db re 1 µPa). The startle reflex response was followed by a flight response. After several exposures seals also started to haulout (leave the water) in response to the sound. These flight responses and the time the animal spent on land built up over time with all animals being very reluctant to enter the pool or come close to the feeding station by the end of the experiments. Aversive behaviour was quantified by an index of aversiveness which was a cumulative index of occurrence of a series of aversive behaviours. Depending on whether all or none of the following behaviours occurred the index ranged from 0 (not aversive) to 4 (highly aversive):

Fish catch prevented.

Seal suddenly turns away from speaker.

Escape/Flight response: seal increases distance to speaker at speeds of more than 3 m/s.

Hauling-out for at least 30 s after flight response

Figure 7:
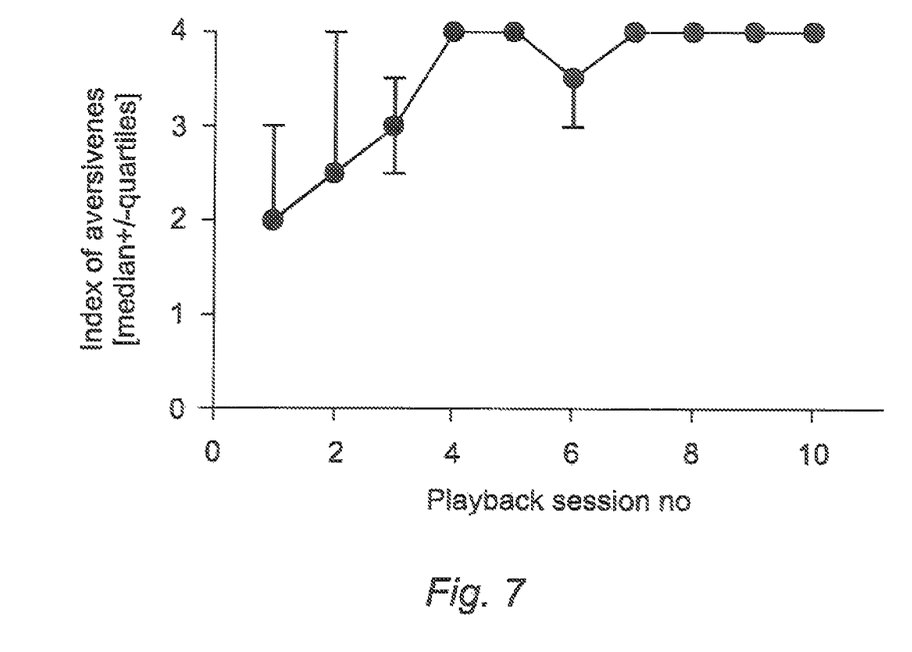
FIG. 7: shows a graph of results from experiments with captive seals showing the seals exhibited a startle reflex response and sensitised to a transmitted sound meaning that aversive responses increased over time.

As shown in FIG. 7 aversive responses increased over time meaning that animals did not habituate but sensitised to the sound. This confirms the theory and is a highly desirable outcome for an acoustic deterrence method. No previous study on acoustic deterrence devices has demonstrated any kind of sensitisation to an acoustic stimulus.

Field Trial on Fish Farm

An ADD was used comprising of a Lubell® 9162 loudspeaker, a Cadence®Z9000 stereo high-power car amplifier, a Panasonic® SL-S120 CD player and a car battery installed in a waterproof aluminium box. The speaker was deployed at 17 m depth, which was about 2 m below the deepest part of a cage in order to avoid sound shadow effects by the fish in the near field. A startle stimulus comprising of a 200 ms long noise pulse with a rise time of 5 ms and peak frequency of 950 Hz, was used. The −0.20 dB bandwidth spanned approximately two to three octaves with the average −20 dB power points being at 450 Hz and 1.9 kHz. The startle pulse was paired with a substantially weaker pre-sound comprising of a 3 Hz frequency modulated 1.2 s long sine wave pure tone. The sweeps caused by the frequency modulation covered a frequency range from 700 Hz to 1.3 kHz and the pre-sound ended 2 s before presentation of the startle pulse.

The noise pulses were played at varying intervals ranging from 2 s to 40 s with an average of 2.4 pulses per minute. In order to make the sound pattern less predictable the signals were arranged digitally into 4 different playback tracks each of which was 1.5 hours long. These playback tracks were assigned to different playback days and played in loop mode from the CD player. Given the signal length of 200 ms, the effective duty cycle of the ADD was 0.08%. The source level of the ADD was adjusted to 180 dB re 1 µPa. Experiments were carried out in sea states less than 3 (slight, 0.5 to 1.25 m wave heights). Good weather days were chosen to use as either a control day with the equipment in place but no playbacks or an exposure day in which the stimulus was played as described above. Average observation periods were 3.5 hours (SD=0.96) on control days and 3.4 hours (SD=0.94) on days with sound exposure. The longest observation period was 5 hours, the shortest 1.5 hours. This protocol resulted in a total of 113 hours of observation with 58 h during sound exposure and 55 h during control periods. Observations were balanced so that tidal state, sea state and time of day were the same for control and sound exposure observation periods.

During observation periods, visual scans were conducted by two observers. One observer was scanning by eye while the other observer was using binoculars. If one of the observers detected a porpoise or seal, bearings and surface positions for each surfacing bout were logged. A group was tracked until no resurfacing occurred 15 min after the last surfacing had been logged. Group and track ID was therefore defined as a consecutive line of surfacings that were not separated by more than 15 min. If another group or species was spotted by the observers while tracking a group, surfacings were logged for both groups.

Figure 5A:
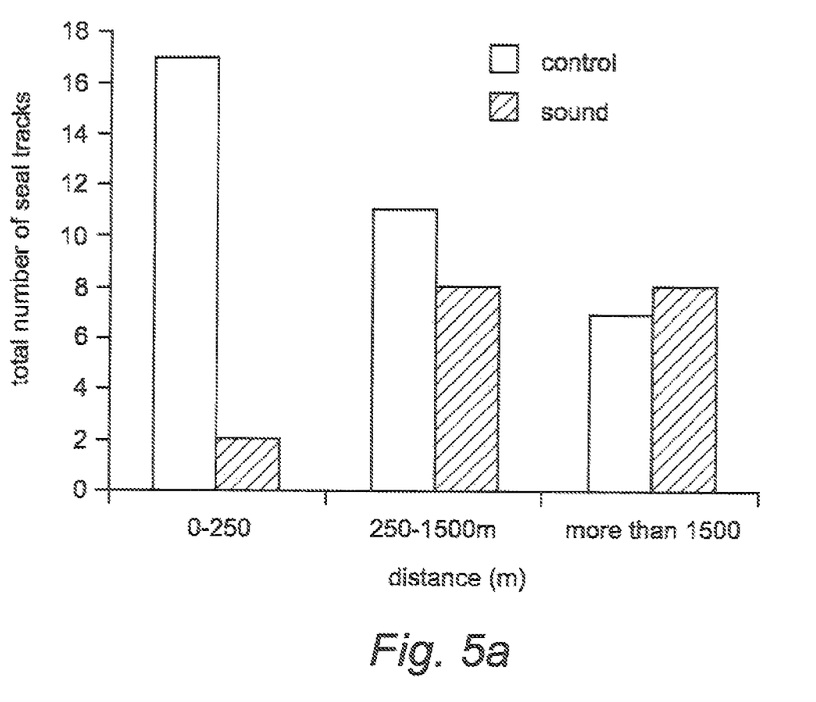
Figure 5B:
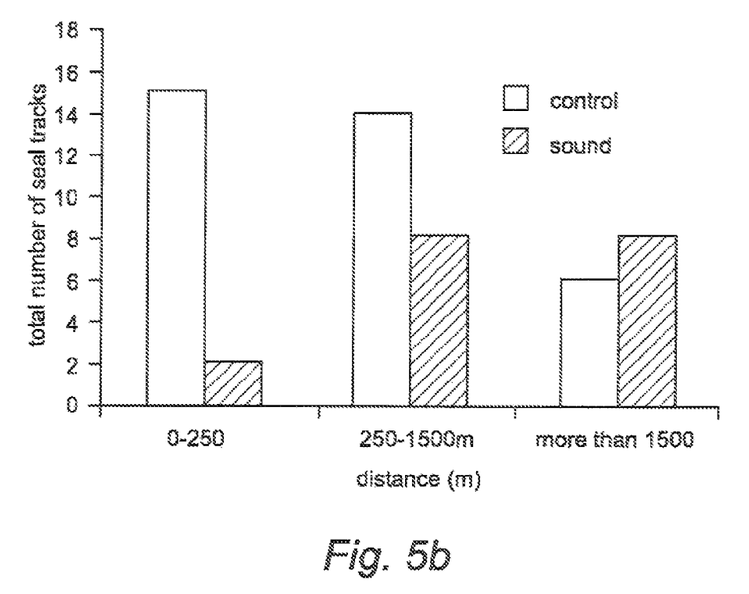
Figure 6A:
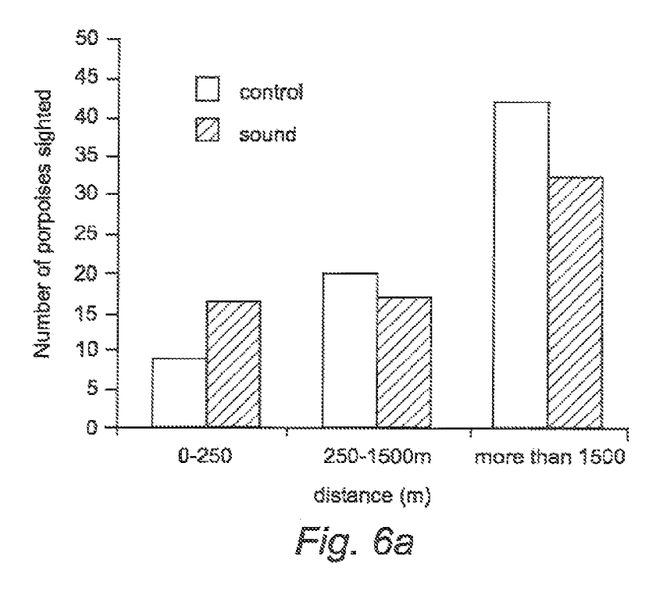
Figure 6B:
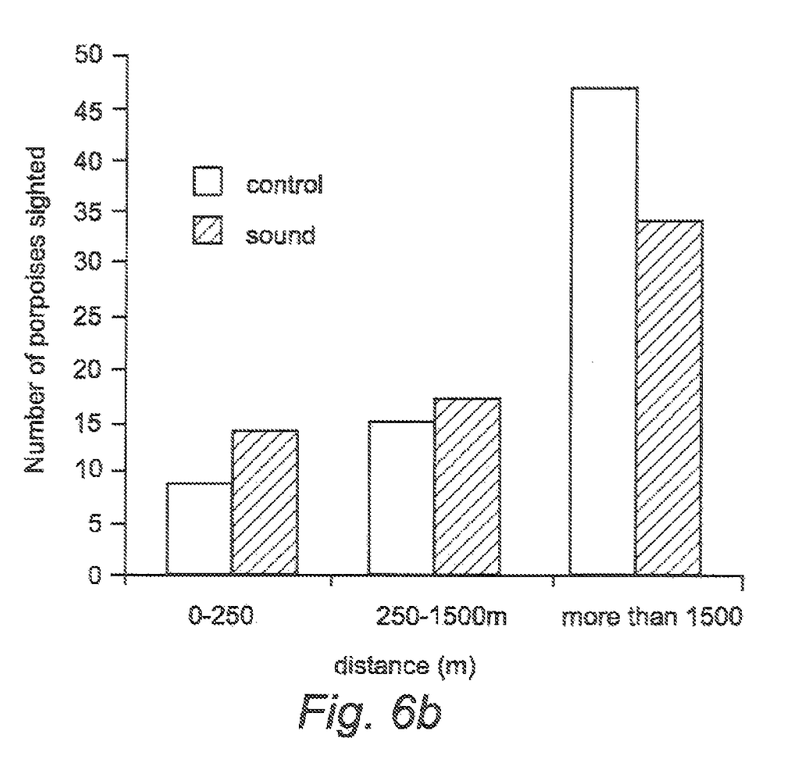

FIG. 5 and FIG. 6 are graphs showing a comparison of seal (FIG. 5A and FIG. 5B) and porpoise (FIG. 6A and FIG. 6B) sightings on "control" days, on which no sounds were played, and "sound" days, on which the sounds described above were played for (A) closest approaches and (B) average distance from the ADD. The results show that seals clearly showed an avoidance response up to 250 m in their closest approaches (FIG. 5A) and in the average distance to the device (FIG. 5B) while porpoises showed no significant differences in either response variable. Porpoise groups were regularly seen swimming between the cages of the fish farm and one porpoise group approached the ADD as close as 7 m during sound exposure. The closest ever observed approach of a seal was approx 50 m during sound exposure.

The field trial showed that an ADD incorporating "startle" sounds did not have a negative effect on harbour porpoise distribution but was effective in reducing the number of seals in the vicinity of the fish farm. This fish farm was unusual in that minke whales used the sea loch with the farm occasionally. The startle sound did not have any effects on minke whales. In the experiments, they were exposed to received level of up to 125 dB re 1 μPa. In fact, considerably more minke whales were spotted on sound exposure days, as oppose to days in which no sound was played as a control level, confirming that the animals do not show a strong avoidance response to the ADD sounds as disclosed herein Other Applications Various improvement and modifications may be made to the above without departing from the scope of the invention. In particular, while embodiments have been described with reference to marine environments, it is to be appreciated that the principles of the invention can be equally applied for the deterrence of any mammal, in sea or on land. The economic advantages applicable to the fish farm industries could be equally applicable to other industries like game reserve control and estate management.

The invention claimed is:

1. A method of deterring mammals comprising configuring an acoustic deterrent system to emit an acoustic signal having characteristics which cause said mammals to be repelled from an area by eliciting a sound-specific oligo-synaptic reflex in said mammals, the acoustic signal being specific to mammals and having characteristics which sensitize said mammals such that repeated exposure to the signal reinforces the sound-specific oligo-synaptic reflex, thereby increasing aversive responses in the mammals over time.

2. A method as claimed in claim 1, wherein the mammals are predatory mammals.

3. A method as claimed in claim 1 wherein said acoustic signal comprises isolated acoustic pulses, the method further comprising repeatedly exposing the mammals to said isolated acoustic pulses so as to sensitize said mammals and increase aversive responses in the mammals over time.

4. A method as claimed in claim 3 wherein each interval between isolated pulses is longer than 2 seconds.

5. A method as claimed in claim 3 wherein said pulses each have a short duration, and the acoustic signal has a low duty cycle, such that in use the energy consumption of the system is low.

6. A method as claimed in claim 5 wherein the duration of each pulse is less than 1 second and the duty cycle of the acoustic signal is less than 10%.

7. A method as claimed in claim 1 wherein the acoustic signal comprises single, isolated pulses emitted at random intervals, each having a short rise time.

8. A method as claimed in claim 1 wherein said characteristics that repel the mammals by eliciting a sound-specific oligo-synaptic reflex comprise a high amplitude and short rise time.

9. A method as claimed in claim 8 wherein the amplitude of the acoustic signal exceeds targeted mammals' auditory threshold by more than 80 dB within 100 ms of the signal's onset.

10. A method as claimed in claim 8 wherein the amplitude of the acoustic signal exceeds targeted mammals' auditory threshold by more than 80 dB within 50 ms of the signal's onset.

11. A method as claimed in claim 1 wherein signal bandwidth spans at least one third of an octave relative to a preselected frequency chosen for a specific mammal.

12. A method as claimed in claim 1 wherein said acoustic signal is emitted when the device is triggered by a sonar system detecting the presence of an animal.

13. A method as claimed in claim 1, wherein incurring a sound-specific oligo-synaptic reflex comprises the steps of:
selecting a target order, family, genus or species of mammals to be deterred;
selecting a received level at a predetermined level above a representative hearing threshold of the targeted mammals;
transmitting an acoustic signal from a transmission point at a source level required, taking into account transmission loss, to create the selected received level at a predetermined distance from the transmission point.

14. A method as claimed in claim 13, wherein the predetermined level is between 80 and 130 dB above the representative hearing threshold at each frequency.

15. A method as claimed in claim 13, wherein the acoustic signal has a duration about as long as the acoustic integration time specific to the targeted mammals auditory system.

16. A method as claimed in claim 13, wherein the acoustic signal has a duration of less than 200 ms.

17. A method as claimed in claim 13, wherein the acoustic signal has a rise time of less than 20 ms.

18. A method as claimed in claim 13, wherein the acoustic signal is as broadband as possible within the designated frequency range.

19. A method as claimed in claim 13, wherein the acoustic signal comprises frequency components at which the aural sensitivity of the targeted mammals is greater than that of selected other animals.

20. A method as claimed claim 13, wherein the acoustic signal uses a frequency greater than 500 Hz for the deterrence of seals or other pinnipeds.

21. A method as claimed in claim 13, wherein the mammals to be deterred comprise sea mammals including pinnipeds, most preferably seals; or cetaceans.

22. A method as claimed in claim 13, wherein the mammals to be deterred comprise land mammals.

23. An acoustic deterrent system for carrying out the method as claimed in claim 1, wherein the acoustic deterrent system comprises a signal transducer arranged to transmit said acoustic signals in accordance with the method of claim 1.

24. An acoustic deterrent system for carrying out the method as claimed in claim 1, wherein the acoustic deterrent system comprises a control unit, a power source, amplifier and transducer means, co-operable to perform the method of claim 1 arranged to produce said acoustic signal.

25. An acoustic deterrent system as claimed in claim 24, wherein the acoustic deterrent system includes a control unit that operates under the control of control software executable on a computer so that the computer is operable as the control unit of claim 24.

26. An acoustic deterrent system as claimed in claim 25, wherein the control software is stored on a computer readable medium comprising the control software as claimed in claim 25.

27. An acoustic deterrent system as claimed in claim 24 wherein each interval between isolated pulses is between 2 seconds and 40 seconds.

28. A method of deterring mammals comprising configuring an acoustic deterrent system to emit an acoustic signal, said acoustic signal being specific to mammals and having characteristics which cause said mammals to be repelled by eliciting a sound-specific oligo-synaptic reflex in said mammals, wherein the acoustic signal comprises single, isolated pulses at random intervals, the amplitude of the acoustic signal exceeding the targeted mammals' auditory threshold by more than 80 dB within 100 ms of the signal's onset.

29. A method as claimed in claim 28 wherein the acoustic signal has characteristics which sensitize said mammals such that repeated exposure to the signal reinforces the sound-specific oligo-synaptic reflex, thereby increasing aversive responses in the mammals over time.

30. A method as claimed in claim 29 wherein said acoustic signal comprises isolated acoustic pulses, the method comprising repeatedly exposing the mammals to said isolated acoustic pulses so as to sensitize said mammals.

31. A method as claimed in claim 30 wherein each interval between isolated pulses is longer than 2 seconds.

32. An acoustic deterrent system as claimed in claim 31 wherein each interval between isolated pulses is between 2 seconds and 40 seconds.

33. A method as claimed in claim 30 wherein said pulses each have a short duration, and the acoustic signal has a low duty cycle, such that in use the energy consumption of the system is low.

34. A method as claimed in claim 33 wherein the duration of each pulse is less than 1 second and the duty cycle of the acoustic signal is less than 10%.

35. A method as claimed in claim 29 wherein the bandwidth of the signal spans at least one third of an octave relative to a preselected frequency chosen for a specific mammal.

36. A method as claimed in claim 29 wherein incurring a sound-specific oligo-synaptic reflex comprises the steps of:

selecting a target order, family, genus, or species of mammals to be deterred, selecting a received level at a predetermined level above a representative hearing threshold of the targeted mammals, and transmitting an acoustic signal from a transmission point at a source level required, taking into account transmission loss, to create the selected received level at a predetermined distance from the transmission point.

37. A method as claimed in claim 28, wherein the mammals are predatory mammals.

38. An acoustic deterrent system for deterring mammals, comprising a control unit, a power source, an amplifier, and a transducer arranged to emit an acoustic signal, said acoustic signal having characteristics which cause said mammals to be repelled from an area by eliciting a sound-specific oligo-synaptic reflex in said mammals, the acoustic signal being specific to mammals and having characteristics which sensitize said mammals such that repeated exposure to the signal reinforces the sound-specific oligo-synaptic reflex, thereby increasing aversive responses in the mammals over time.

39. An acoustic deterrent system as claimed in claim 38 wherein the amplitude of the acoustic signal exceeds targeted mammals' auditory threshold by more than 80 dB within 100 ms of the signal's onset.

40. An acoustic deterrent system as claimed in claim 38 wherein the amplitude of the acoustic signal exceeds targeted mammals' auditory threshold by more than 80 dB within 50 ms of the signal's onset.

41. An acoustic deterrent system as claimed in claim 38 wherein signal bandwidth spans at least one third of an octave relative to a preselected frequency chosen for a specific mammal.

42. An acoustic deterrent system as claimed in claim 38 wherein said acoustic signal comprises isolated acoustic pulses, said acoustic deterrent system being arranged to repeatedly expose the mammals to said isolated acoustic pulses so as to sensitize said mammals.

43. An acoustic deterrent system as claimed in claim 42 wherein each interval between isolated pulses is longer than 2 seconds.

44. An acoustic deterrent system as claimed in claim 43 wherein each interval between isolated pulses is between 2 seconds and 40 seconds.

45. An acoustic deterrent system as claimed in claim 42 wherein said pulses each have a short duration, and the acoustic signal has a low duty cycle, such that in use the energy consumption of the system is low.

46. An acoustic deterrent system as claimed in claim 45 wherein the duration of each pulse is less than 1 second and the duty cycle of the acoustic signal is less than 10%.

47. An acoustic deterrent system as claimed in claim 38 wherein the acoustic signal comprises single, isolated pulses emitted at random intervals, each having a short rise time.

48. A method as claimed in claim 38, wherein the mammals are predatory mammals.

* * * * *